United States Patent Office.

IMPROVEMENT IN TREATING ORES OF COPPER AND OTHER METALS TO OBTAIN METALS AND OTHER PRODUCTS THEREFROM.

WILLIAM HENDERSON, OF GLASGOW, SCOTLAND.

Letters Patent No. 60,514, dated December 18, 1866.

*The Schedule referred to in these Letters Patent and making part of the same.*

TO ALL WHOM IT MAY CONCERN:

Be it known that I, WILLIAM HENDERSON, of Glasgow, Scotland, have made new and useful Improvements in Treating Certain Ores and Alloys, and in Obtaining Metals and other Products Therefrom.

These improvements relate to the economical treatment of minerals containing copper, iron, and several other metals, and have for their object the utilizing of ores either too poor to treat economically by the usual processes, or the separation of different metals occurring in one mineral from one another, and which metals, though valuable separately, are valueless, or much reduced in value, by being alloyed. These improvements consist of—

1. Two processes for the treatment of ores of copper, when found as oxides, carbonates, phosphates, arseniates, or other salts of copper.

2. An improved process for obtaining copper and silver from sulphuret ores of copper or silver.

The first class of ores, namely, ores of copper, when found as oxides, carbonates, or other salts of copper, I treat in the following manner: The ore is crushed to pass through a half-inch riddle, and introduced into tanks or vats, made of stone, wood, or other suitable material, about three feet deep. The vats should all have loose perforated false bottoms resting on cross-bearers. To prevent the ore passing through the false bottom, a layer of brush-wood and coarse straw, or other suitable materials, should be placed over it. The crushed ore is then introduced, and should be made to fill the vat to within a few inches of the top. Muriatic acid, or acid perchloride of iron, sufficient to cover the ore, is poured on the surface, and allowed to work downwards through the mass. A pump, or other like mechanical agent, made of suitable materials, is fixed in the vat, and reaches below the false bottom. As the liquor filters downward, it is frequently pumped up again to the surface, and a constant circulation is thus maintained until the acid is saturated. When the acid or liquor has taken up as much metal as possible, and the copper has been all dissolved, the residue is washed perfectly clean and removed. When the ore is poor, and consists of a loose, friable rock, such as sandstone, the acid may, if convenient, be used very weak, and in ordinary weather, cold. Generally, a temperature of 100° Fahrenheit, and the acid as strong as possible, answers best for muriatic-acid solutions. Having obtained a clear saturated solution of the metals, and if only acid has been used, it may be treated at once with caustic lime, very slightly in excess, which will precipitate all the copper. This precipitation is most economically and expeditiously effected at a boiling heat. Finely powdered carbonate of lime at a boiling heat will also precipitate copper, and so will carbonate of barytes, or sulphuret of barium, carbonate and sulphuret of strontian, carbonate of magnesia, or lime made from magnesian limestone, or, lastly, the sulphuret of lime waste from the manufacture of alkali; but when the only object in view is that of obtaining the copper precipitate as rich as possible, and where the prices are equal, I prefer caustic lime. When the ores contain a large proportion of oxide of iron, and especially when it exists as protoxide, and always when perchloride of iron has been used as a solvent, it will be more economical to use scrap iron, or the reduced iron powder, to be presently described, to precipitate the copper at once from the original solution.

The result of the use of any of the above precipitants is the production of a hydrate of oxide of copper, or other metal, carbonate, sulphuret, or metallic precipitate, as the case may be, and a solution of chloride of the metal or alkaline earth which has been used as a precipitant. The precipitate, after washing and drying, is smelted for the metal in the usual way. I concentrate the solutions of chloride of calcium, magnesium, barium, or strontian, or a mixture of either, by evaporation. If it is only desired to recover the muriatic acid contained in these salts, it is most completely and expeditiously effected by one or other of the following methods: In a common reverberatory furnace, with the bottom made concave towards the middle, and two exit flues, one communicating with the chimney and the other with a stone tower or condenser, of a similar description to those in common use for condensing muriatic acid, the damper leading to the condenser being closed and the other opened, about two tons of sand, or the insoluble matter from the ore, is brought to a bright red heat, and then the damper leading to the chimney closed and the other opened. A small stream or shower of the boiling and highly concentrated chloride solution is then allowed to play on the red-hot sand, the workmen all the while thoroughly mixing and incorporating them together. The heat must never be allowed to fall below dull redness, nor must too large a stream of liquor be introduced on the sand. By attention to these precautions, it will be found that a silicate of lime, or other alkaline earth, has been produced in the furnace, and muriatic-acid gas evolved, which, passing into the tower, is condensed in the usual manner, and is then fit for further use in treating fresh ore. If iron has been used as a precipitant, only a portion of the chloride need be decomposed, which I prefer to accomplish in the following manner: The solution must be gently evaporated to dryness, either in pans, exactly as common salt is usually made, or in an open furnace, the salt being withdrawn from the furnace whilst still damp, care being taken to prevent it decomposing. It is then placed in a close calcining furnace, which has a flue communicating with a condenser and the interior of the furnace. Sand or exhausted ore, in any proportion not exceeding fifty per cent., greatly assists the decomposition, and may be added either in the evaporating furnace or mixed with the salt before introduction to the calcining furnace. When the furnace has been brought to dull redness, the mixed salt and silica is thrown into the furnace, so as to cover the sole about three inches thick. At first steam and muriatic acid are given off, until the salt is quite dry, and the charge should be constantly stirred to this point to prevent caking. As soon as the salt is hot and thoroughly dry, chlorine and perchloride of iron are freely evolved. All these gases are passed up through the condenser, which is a stone or wood erection filled with coke. Instead of supplying this condenser with water, as is usually done, I pump up the weaker iron liquors produced by precipitating the copper with iron. These in descending absorb the muriatic acid and chlorine ascending, and run out at the base into receivers as strongly acid perchloride of iron. If this liquor shows any turbidity, or deposits peroxide of iron on standing, a jet of steam, introduced into the calcining furnace whilst the salt is calcining, will produce sufficient acid to render it clear again. The calcination should be continued until the whole of the salt is converted into oxide of iron or has sublimed. The perchloride of iron solution thus obtained will dissolve copper from this class of ores, and even, in some cases, red oxide sulphides and metallic copper, much more freely than muriatic acid.

My second process, for the first class of ores, is as follows: When a large proportion of the red or suboxide of copper exists in the ore, it should be reduced to coarse powder, and heated red hot and calcined in an open furnace, with free admission of air, until all the red or suboxide is converted into the black or protoxide of copper. When the ore contains only a small proportion of suboxide of copper, or when, through local or other causes, the preliminary calcination is inconvenient or objectionable, I use sulphuric acid containing nitrous or nitric acid, which readily dissolves the suboxide of copper; or the ore may be treated in the usual way, with sulphuric acid, and the remaining suboxide may be extracted or separated by dressing, or washing with water, as is well understood. If the ore contains no suboxide or sulphuret of copper, neither the preliminary calcination nor the use of nitric acid is necessary. The ore is then introduced into vats with false bottoms, constructed and worked as already described. The ore is then covered with dilute sulphuric acid of from 1.20 to 1.40 specific gravity, according to the richness and condition of the ores. When fully saturated with copper or other metal, it is tapped into another vessel or receiver. The ore, if necessary, is treated then with fresh acid until exhausted. The residue is well washed with hot water and is moved to the waste heap. The solutions of sulphate of copper, or other metal, are concentrated in leaden pans, as far as possible, without salting; the strong liquors may then be run into a furnace and evaporated to dryness at a gentle heat; the resulting dry sulphate of copper contains only one equivalent of water. The concentrated solutions may also be crystallized, and the crystals dried, at from 320° to 380° Fahrenheit. The dry sulphate of copper is then introduced into a retort, or close calcining furnace, and heated to bright redness. The protoxide of copper at a red heat parts with the whole of its sulphuric acid, which passes off as a heavy vapor, and is conveyed from the furnace by flues into a leaden chamber or condenser. When the sulphate of copper in the retort ceases to emit fumes when subjected to a bright red heat, the residue is withdrawn from the retort or furnace, and will be found to be oxide of copper, more or less pure. This oxide is then mixed with carbonaceous matter and a small quantity of silicious ore free from sulphur, and smelted in a reverberatory furnace in the usual manner; the result will be rough copper, perfectly free from regulus and fit for refining.

To produce metallic copper direct from the anhydrous sulphate, and at the same time recover all or nearly all the sulphuric acid, I proceed as follows: I take the anhydrous or dried sulphate, obtained as has been already described, or from any other source, and reduce it to powder, and mix it with from ten to twenty per cent. of charcoal powder, or an equivalent proportion of anthracite coal or other carbonaceous matter. I prefer charcoal reduced to powder. The anhydrous sulphate of copper and carbonaceous matter are then intimately mixed. The mixture is then subjected to a gradually increasing heat in close vessels, with an escape-pipe or flue to convey away the gases, to be treated as shall be presently described. The close vessels already mentioned may consist of a series of flues covered with tiles, under which the flames from the fires pass, and which are well known, and are in common use, as close calcining furnaces, or they may be clay or cast-iron retorts. When the furnace or retorts are all filled, the heat is gradually and steadily increased for from four to six hours, at the end of which time the heat should not exceed a very dull red heat, and the charge should be equally well heated all through, and as near as possible alike in all the retorts. When the discharge of gas has become feeble, the retorts must be raised to bright redness for half an hour, or until all sulphurous-acid gas has been evolved. I then allow the heat to go back to dull redness, and then unscrew the doors, and the metallic copper in fine particles, which, with the excess of charcoal, is all that remains in the retorts, is then raked out into iron barrows or wagons; the copper is so far advanced as only to require refining to fit it for the market. The gases evolved from the retorts are a mixture of carbonic acid and sulphurous acid. All the pipes from the retorts or close furnaces pass into a main pipe, which is connected with a vitriol chamber, into which the gases pass, being first mixed with the requisite portion of nitrous gases, as is well understood in the manufacture of sulphuric acid from the usual sources. The chamber is supplied with steam and worked in every respect as is usually done in manufacturing sulphuric acid from brimstone. The sulphurous acid by these means is, with very little loss, readily converted into sulphuric acid, which I again use for the purpose of extracting the copper from fresh ore. As soon as the cast-iron retorts are empty they are charged again. Great care is required that the heat be not too high at the commencement of the operation; it should not exceed 400 degrees for the first hour, and be steadily increased up to 800 degrees or more at the close of the operation. If these precautions are not carefully observed, sulphuret of copper will be produced.

The second class of ores I treat as follows: If the proportion of sulphur existing in the ore is more than one and a half times as much as the metal or metals to be extracted, it should be reduced to at least that amount by calcination; or, if the ore contain much silica, the proportion of sulphur may be even lower than equal proportions. The ores are reduced to fine powder generally, the finer the better, although for copper ores very rich in iron, a sieve of eight holes to the inch will be as fine as can be conveniently worked in the tanks. The ores are then mixed with from five to fifty per cent. of common salt. The mixture is then placed in retorts or close calcining furnaces, having flues or pipes communicating with the interior of the furnace or retort, and a condensing apparatus. In these furnaces the mixture is subjected to various degrees of heat, according to the nature of the ore and the metal or metals contained in it. If the ore contain much sulphur and little silica, the heat must be applied carefully at first, and gradually increased, stirring at short intervals. When the ore is one of copper or zinc, and has been previously burnt or calcined, the mixture of salt and pulverized ore may be at once subjected to a bright red heat; the volatilized chlorides, passing into the condensing apparatus, are condensed with water. The ore is withdrawn from the furnace whenever it ceases to smoke strongly, and if any copper or other metal still remains in the calcined ore, it is only necessary to wash it with the hot acid solution that runs from the tower or condensing apparatus. By these means the last trace of copper or other metal is readily extracted. The copper or other metal is obtained from the solutions by precipitation with iron, lime, or an alkali, and the sulphate of soda may be afterwards obtained by evaporation or crystallization. When a copper ore contains less sulphur than copper, the sulphur should be increased by mixture with a raw ore, poor in copper and rich in sulphur, so that the copper and sulphur stand in equal proportions. When the ore contains a large proportion of silica, and is free from earthy bases, the proportion of sulphur may be much lower. The proportion of salt to be used very much depends upon the composition of the ores. Unless sulphur exists in very large proportion, twice as much common salt as metal to be extracted is, I find in practice, a very safe quantity to use as a general rule. When the proportion of copper in the burnt pyrites or silicious ores exceeds three per cent., it is not economical to keep it too long in the furnace; I therefore withdraw it from the furnace as soon as I find that all the copper has been converted into chloride or subchloride of copper. Whilst the ore is still hot, I immerse it in the acid liquor from the tower or condenser, with the addition of a little muriatic acid, about one-half cwt. to the ton of ore, which will remove the last traces of copper at once. When the ore treated has been a burnt pyrites, it will not be found necessary to use any acid. This process may be varied. For instance, in localities where common salt and metallic iron are expensive, other substances can be substituted. Sometimes the waste chloride of iron solutions may be conveniently evaporated, by the waste heat from the calcining furnaces, in wrought or cast-iron pans, and the dry salt (chloride of iron) may then be mixed with fresh ore, with or without any fresh common salt. The copper may also be precipitated from the chloride of copper solutions by caustic lime or carbonate of lime at a boiling heat, and the resulting chloride of calcium, when evaporated to dryness, or as a concentrated liquid, may be mixed with fresh ores, so as partially or entirely to replace or substitute the common salt. All the other alkalies or alkaline earths may also be used in place of lime. When sulphuric acid or muriatic acid is used to dissolve the copper from ores containing suboxide of copper, metallic copper, or from sulphuret ores of copper that have been previously calcined to dissolve the suboxide, metallic, or undecomposed sulphuret, I employ a small proportion of nitrate of soda, potash, or other nitrate readily decomposable by sulphuric or muriatic acid. The nitrate is mixed with the copper solution, and nitric acid being gradually liberated, the metallic copper, suboxide, or sulphuret, not soluble in the other acid, is immediately dissolved.

For the sake of clearness in the description of the methods I pursue to obtain the metals from their ores, I have principally mentioned the ores of copper; but I would have it to be distinctly understood that I claim the extension of the sulphuric-acid process to the ores of zinc and several other metals, and the process for subliming the chlorides to the poor ores of all metals whose chlorides are volatile at any degree of heat. I am aware that both sulphuric acid and common salt have been used in various ways for the purpose of extracting the metals from their ores; therefore I do not claim the use of these materials. Heretofore the great objection to the use of salt has been the loss of the metals through sublimation, if the heat was not very carefully managed and kept very low; the process was therefore slow and imperfect. By the processes I have described these evils have been remedied. So, in like manner, the cost of sulphuric acid has been heretofore so very great that the economical extraction of copper or zinc from their ores has been rendered impossible; whereas, by the processes I have described, one ton of brimstone made into acids extracts from ten to fifteen tons of metallic copper from its ores.

To produce iron powder for the purpose of precipitating copper and other metals from their solutions, I take a pure hematite ore and grind it to fine powder, with five cwt. of coal to the ton of ore, or four and a half cwt. of charcoal and one-half cwt. of oxide of magnesia. These are all crushed and mixed together, and the mixture is heated in retorts or close furnaces, at a bright red heat, for from twelve to twenty-four hours. When all the oxide has been reduced, the contents of the furnace are raked through a hole in the floor of the retort or furnace into an air-tight cast or wrought-iron box, where it is allowed to remain until it has cooled down below redness. The reduced oxide is then ground in the mill to very fine powder, the finer the better, and this powder is fit for use. It should be gradually added to a copper solution, with constant agitation, and it will be found to precipitate copper and silver from their solutions with great rapidity.

I claim as my invention, and desire to secure by Letters Patent—

1. The two several improved processes hereinbefore described for extracting copper from any ore in which it may be found as a salt of copper, whether iron or other metal be or be not found in such ore.

2. The improved process and processes hereinbefore described for separately obtaining from the sulphuret ores of copper, silver, zinc, or other metal, the copper, silver, zinc, or other metal therein contained, whether the object be to obtain from such sulphurets one only or all of the metals therein contained.

3. The manufacture of the product hereinbefore denominated iron powder by the process hereinbefore described, to be used in the process hereinbefore described as a precipitate.

WM. HENDERSON.

Witnesses:
    WILLIAM McIVER, *of 45 West George Street, Glasgow, Clerk-at-Law.*
    ROBERT McGOWAN, *of 45 West George Street, Glasgow, Clerk-at-Law.*